N. & C. Carstens,
Weeding-Mach.

Nº 75,858. Patented Mar. 24, 1868.

Witnesses.
H. C. Aslikettes
Wm A. Morgan

Inventor:
N. Carstens
C. Carstens
per Munn & Co
Attorneys

United States Patent Office.

NICOLAUS CARSTENS AND CHARLES CARSTENS, OF NEW YORK, N. Y.

Letters Patent No. 75,858, dated March 24, 1868.

IMPROVEMENT IN WEEDING-MACHINES.

The Schedule referred to in these Letters Patent and making part of the same.

TO ALL WHOM IT MAY CONCERN:

Be it known that we, NICOLAUS CARSTENS and CHARLES CARSTENS, of the city, county, and State of New York, have invented a new and improved Weeding-Machine; and we do hereby declare that the following is a full, clear, and exact description thereof, which will enable others skilled in the art to make and use the same, reference being had to the accompanying drawings, forming a part of this specification, in which—

Similar letters of reference indicate corresponding parts.

Figure 1:
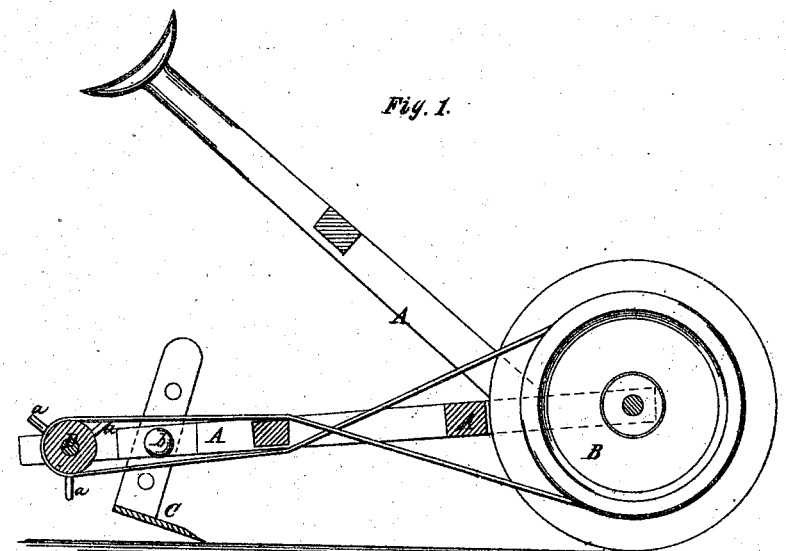
Figure 1 represents a longitudinal vertical section of our improved weeding-machine.
Figure 2:
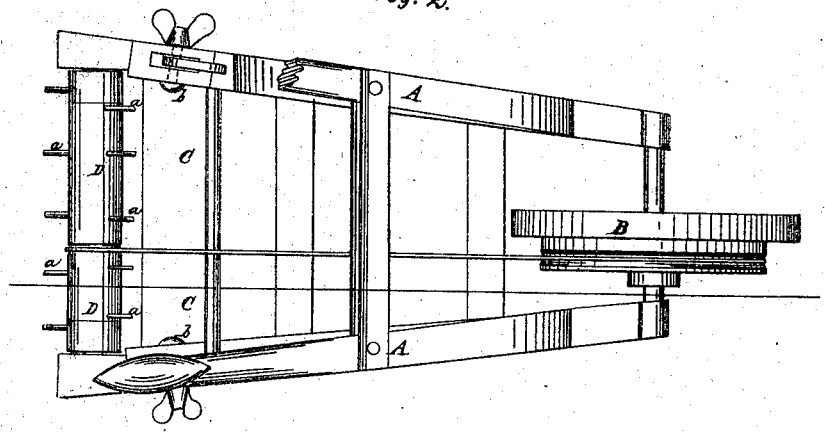
Figure 2 is a plan or top view of the same.

This invention relates to a new machine for removing and destroying weeds from walks and other places; and consists in the application of a revolving rake in rear of the weeding-tool, for the purpose of throwing around and separating the weeds that were cut off by the tool, and to deposit them upon the ground or into a box, so that they cannot grow again.

In ordinary weeding-instruments the plants cut off were mixed with, and sometimes brought under the ground, and were thereby kept in the soil, whereby many of them were caused to grow and thrive again; but by having the rake, the plants will all be separated from the ground and replaced upon but not intermingled with the same, and they will be exposed to the dangerous influence of the sun's rays.

A, in the drawing, represents the frame of our improved weeding-machine. The same is of suitable size and construction, and is partly supported by a suitable wheel or wheels, B, in any suitable manner. C is the up-and-down adjustable weeding-tool or cutter, arranged on the frame A. Behind the cutter is a revolving horizontal rake, D, with suitable teeth, $a$ $a$, driven by a band from the wheel B, or otherwise.

The operation will, from the foregoing, be fully understood.

The cutter C has upturned ends, which are, by means of pins $b$ $b$, pivoted to the frame A. By having the cutter thus pivoted, it will, when the machine is set in motion, stand inclined, with its cutting-edge on the ground, as shown in fig. 1; and by this arrangement the cutter is made yielding to obstructions, and is held in a position which allows it to get at the roots of the woods.

Having thus described our invention, what we claim as new, and desire to secure by Letters Patent, is—

1. Arranging a revolving rake in rear of the cutter of a weeding-machine, substantially as and for the purpose herein shown and described.

2. Pivoting the cutter of a weeding-machine to the frame, so that it can swing freely on the pivots, substantially as herein shown and described.

NICOLAUS CARSTENS,
CHARLES CARSTENS.

Witnesses:
WM. F. MCNAMARA,
ALEX. F. ROBERTS.